United States Patent
Myers et al.

(10) Patent No.: US 10,216,782 B2
(45) Date of Patent: Feb. 26, 2019

(54) PROCESSING OF UPDATES IN A DATABASE SYSTEM USING DIFFERENT SCENARIOS

(71) Applicant: SAP SE, Walldorf (DE)

(72) Inventors: William Myers, Brisbane (AU); Brendon Atkins, Brisbane (AU)

(73) Assignee: SAP SE, Walldorf (DE)

( * ) Notice: Subject to any disclaimer, the term of this patent is extended or adjusted under 35 U.S.C. 154(b) by 289 days.

(21) Appl. No.: 15/336,609

(22) Filed: Oct. 27, 2016

(65) Prior Publication Data

US 2018/0046662 A1 Feb. 15, 2018

(51) Int. Cl.
*G06F 17/00* (2006.01)
*G06F 17/30* (2006.01)

(52) U.S. Cl.
CPC .... *G06F 17/30365* (2013.01); *G06F 17/3038* (2013.01); *G06F 17/30324* (2013.01); *G06F 17/30333* (2013.01); *G06F 17/30339* (2013.01); *G06F 17/30368* (2013.01); *G06F 17/30454* (2013.01); *G06F 17/30477* (2013.01); *G06F 17/30498* (2013.01); *G06F 17/30563* (2013.01)

(58) Field of Classification Search
CPC ......... G06F 17/30365; G06F 17/30324; G06F 17/30333; G06F 17/30339; G06F 17/30368; G06F 17/3038; G06F 17/30454; G06F 17/30477; G06F 17/30498; G06F 17/30563
USPC ........................................................ 707/689
See application file for complete search history.

(56) References Cited

U.S. PATENT DOCUMENTS

| | | | | |
|---|---|---|---|---|
| 5,724,575 A | * | 3/1998 | Hoover | G06F 17/30424 |
| 5,842,196 A | * | 11/1998 | Agarwal | G06F 17/30327 |
| 6,223,171 B1 | * | 4/2001 | Chaudhuri | G06F 11/3447 |
| | | | | 707/718 |
| 8,918,363 B2 | * | 12/2014 | Naidu | G06F 17/30575 |
| | | | | 707/610 |
| 2012/0030258 A1 | * | 2/2012 | Jain | G06F 17/30309 |
| | | | | 707/812 |

(Continued)

FOREIGN PATENT DOCUMENTS

WO WO 03/096227 A2 * 11/2003 ............. G06F 17/30

OTHER PUBLICATIONS

Sikka, Vishal, et al., "Efficient Processing in SAP HANA Database—The End of Column Store Myth", SIGMOD '12, Scottsdale, AZ, May 20-24, 2012, pp. 731-741.*

(Continued)

*Primary Examiner* — Robert Stevens
(74) *Attorney, Agent, or Firm* — Fountainhead Law Group P.C.

(57) ABSTRACT

In one embodiment, a method determines one or more records that are added, updated, or deleted for an entity. One or more effective from dates for the one or more records and a last effective from date for the entity in a database table for the entity is analyzed to classify the one or more records in one or more scenarios in a plurality of scenarios. The method selects a scenario in the plurality of scenarios based on the one or more effective from dates for the one or more scenarios and the last effective from date for the entity. Then, an update process associated with the scenario is performed to update a portion of records in the database table using the one or more records.

20 Claims, 12 Drawing Sheets

(56) References Cited

U.S. PATENT DOCUMENTS

| | | | | |
|---|---|---|---|---|
| 2012/0086544 A1* | 4/2012 | Kemp | ................... | G06F 9/5072 |
| | | | | 340/5.1 |
| 2014/0122439 A1* | 5/2014 | Faerber | ............. | G06F 17/30315 |
| | | | | 707/683 |
| 2014/0278755 A1* | 9/2014 | Eberl | ................ | G06F 17/30539 |
| | | | | 705/7.29 |
| 2014/0317087 A1* | 10/2014 | Collins | ............. | G06F 17/30442 |
| | | | | 707/715 |
| 2015/0074038 A1* | 3/2015 | Sarferaz | ............ | G06F 17/30563 |
| | | | | 707/602 |
| 2018/0032565 A1* | 2/2018 | Shah | ................. | G06F 17/30539 |

OTHER PUBLICATIONS

Färber, Franz, et al., "The SAP HANA Database—An Architectural Overview", Bulletin of the IEEE Computer Society Technical Committee on Data Engineering, © 2012 IEEE, 6 pages.*

Lomet, David, et al., "Transaction Time Support Inside a Database Engine", ICDE '06, Atlanta, GA, Apr. 3-7, 2006, 12 pages.*

* cited by examiner

303

| | 304-1 | 304-2 | 304-3 |
|---|---|---|---|
| | Entity ID | Effective From Date | Location |
| 306-1 | 1 | 2010-01-01 | A |
| 306-2 | 1 | 2011-29-04 | B |
| 306-3 | 1 | 2013-02-07 | C |
| 306-4 | 1 | 2014-09-12 | D |

158

| | 310-1 | 310-2 | 310-3 | 310-4 | 310-5 |
|---|---|---|---|---|---|
| | Entity ID | Effective From Date | Effective To Date | Location | Other Attribute |
| 312-1 | 1 | 2010-01-01 | 2011-02-03 | A | Z |
| 312-2 | 1 | 2011-29-04 | 2013-02-06 | B | Y |
| 312-3 | 1 | 2013-02-07 | 2014-09-11 | C | X |
| 312-4 | 1 | 2014-09-12 | 9999-12-31 | D | W |

| Entity ID (304-1) | Effective From Date (304-2) | Location (304-3) |
|---|---|---|
| 1 | 2010-01-01 | A |
| 1 | 2011-29-04 | B |
| 1 | 2013-02-07 | C |
| 1 | 2014-09-12 | E |

FIG. 4B

| Entity ID (310-2) | Effective From Date (310-2) | Effective To Date (310-3) | Location (310-4) | Other Attribute (310-5) |
|---|---|---|---|---|
| 1 | 2010-01-01 | 2011-02-03 | A | Z |
| 1 | 2011-29-04 | 2013-02-06 | B | Y |
| 1 | 2013-02-07 | 2014-09-11 | C | X |
| 1 | 2014-09-12 | 9999-12-31 | E | W |

FIG. 4C

| User ID (310-2) | Effective From Date (310-2) | Effective To Date (310-3) | Location (310-4) | Other Attribute (310-5) |
|---|---|---|---|---|
| 1 | 2013-02-07 | 2016-09-12 | C | X |
| 1 | 2014-09-12 | 9999-12-31 |   | W |
| 1 | 2014-09-12 | 9999-12-31 | E |   |

PROCESSING OF UPDATES IN A DATABASE SYSTEM USING DIFFERENT SCENARIOS

CROSS REFERENCE TO RELATED APPLICATIONS

The present disclosure claims priority to U.S. Provisional App. No. 62/374,708, entitled "In-Memory Database System for Performing Online Analytics Processing", filed Aug. 12, 2016, the contents of which is incorporated herein by reference in its entirety.

BACKGROUND

In the new era of big data, companies and other organizations have access to vast amounts of structured and unstructured data as well as access to a variety of new data sources. As a result, many data analytics applications have been developed to provide users with insight into their data. One example genre of data analytics applications includes workforce analytics. Workforce analytics applications are used by businesses and other organizations to assist users in understanding their data, making appropriate decisions, and find answers to key questions to gain the insight needed to take actions. Workforce analytics applications are adapted for providing statistical models to worker-related data, allowing companies to optimize their various enterprise processes.

The company's data may change on a continuous basis. For example, employee records may be updated, added, or changed. When this happens, the data stored in the database needs to be updated. When the update includes a direct copy of the data, which means that one record can simply be compared to a copy of itself to see if the record has changed, then only that record needs to be updated. However, the process becomes more complicated when transformations of the updated record are required.

SUMMARY

In one embodiment, a method determines one or more records that are added, updated, or deleted for an entity. One or more effective from dates for the one or more records and a last effective from date for the entity in a database table for the entity is analyzed to classify the one or more records in one or more scenarios in a plurality of scenarios. The method selects a scenario in the plurality of scenarios based on the one or more effective from dates for the one or more scenarios and the last effective from date for the entity. Then, an update process associated with the scenario is performed to update a portion of records in the database table using the one or more records.

In one embodiment, a non-transitory computer-readable storage medium contains instructions, that when executed, control a computer system to be configured for: determining one or more records that are added, updated, or deleted table for an entity; analyzing one or more effective from dates for the one or more records and the last effective from date for the entity in a database table for the entity to classify the one or more records in one or more scenarios in a plurality of scenarios; selecting a scenario in the plurality of scenarios based on the one or more effective from dates for the one or more scenarios and the last effective from date for the entity; and performing an update process associated with the scenario to update a portion of records in the database table using the one or more records.

In one embodiment, A method includes: determining, by a computing device, a plurality of records that are added, updated, or deleted for an entity; analyzing, by the computing device, an effective from date for the plurality of records and a last effective from date for the entity in a database table for the entity to classify the plurality of records in a plurality of scenarios based on the effective from date for plurality of records and the last effective from date for the entity; selecting, by the computing device, a scenario in the plurality of scenarios; and performing, by the computing device, an update process associated with the scenario to update a portion of records in the database table using the plurality of records, wherein the scenario is used to update all of the plurality of records.

The following detailed description and accompanying drawings provide a better understanding of the nature and advantages of particular embodiments.

BRIEF DESCRIPTION OF THE DRAWINGS

FIG. 3A shows an example of tables used in processing scenario #1 according to one embodiment.

FIG. 4A shows an example of the source table after the update has occurred according to one embodiment.

FIG. 4B shows an example of the fact table after the update according to one embodiment.

FIG. 4C shows the records that were processed to perform the update according to one embodiment.

DETAILED DESCRIPTION

Described herein are techniques for a system to process updates to records in a database. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments process updates based on a set of scenarios. In one embodiment, three scenarios are used, but other scenarios may be used. An update processor may select one of the scenarios based on analyzing the records for the entity (e.g., an employee) that are updated. The scenarios attempt to only process records for entities who are affected by the change and only process records for the time periods for those entities that are affected.

Figure 1A:
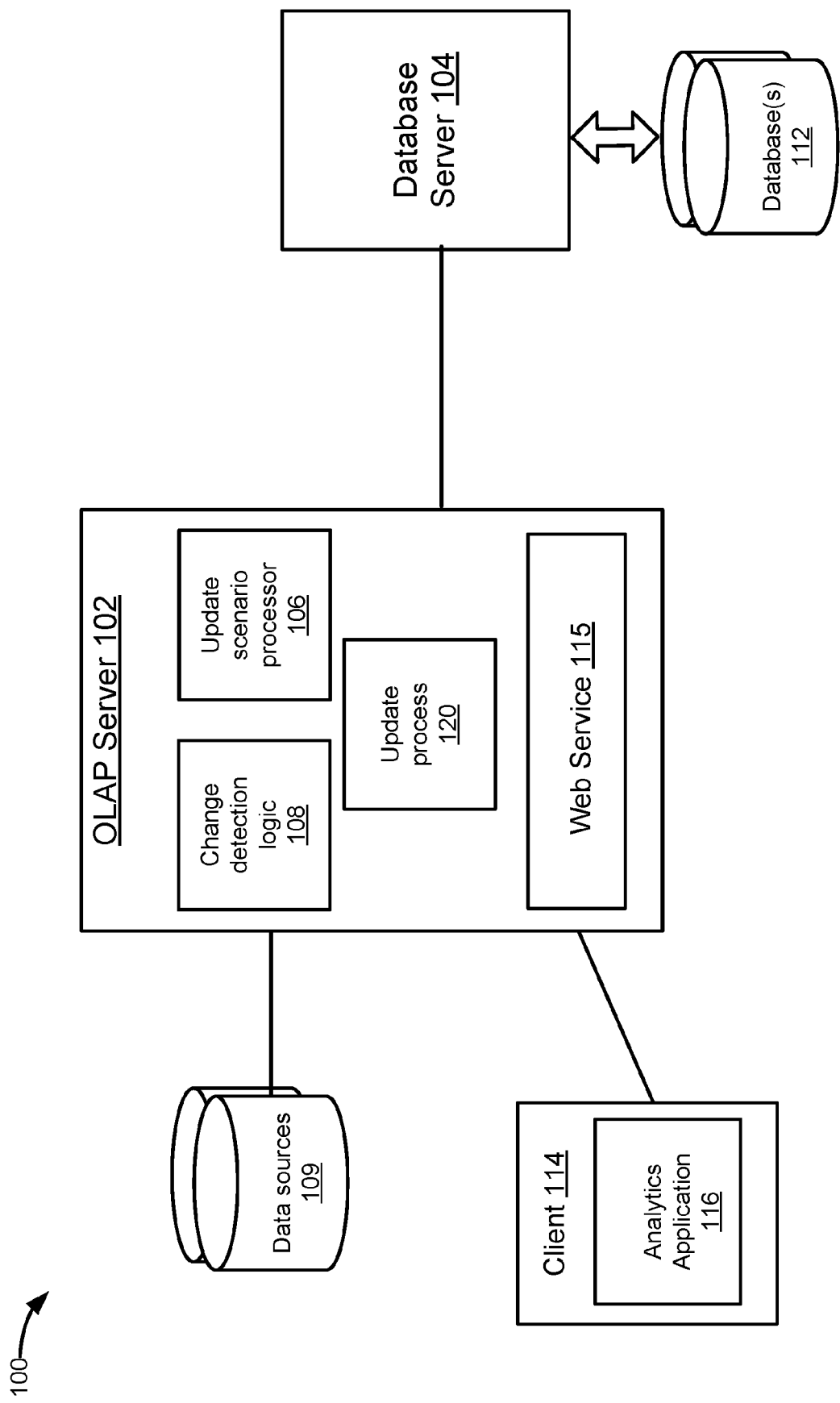
FIG. 1A depicts a simplified system of a system for processing updates using scenarios according to one embodiment.

FIG. 1A depicts a simplified system 100 of a system for processing updates using scenarios according to one embodiment. Source data is provided by a number of different data sources 109. The source data may be received at an online analytical processing ("OLAP") server 102 or stored in OLAP server 102. Data sources may include data records for one or more entities (e.g., employees, persons, or other entities) of subscribers. Subscribers may include customers, businesses, companies, and other entities for which data is stored in database 112.

In one embodiment, database 112 is an OLAP database that can be accessed by a client 114 using an analytics application 116. Analytics application 116 may include a workforce analytics (WFA) application. As discussed above, workforce analytics applications are used by subscribers in understanding the subscribers' data. For example, workforce analytics applications are adapted for providing statistical models to worker-related data. A web service 115 may be used to respond to queries from analytics application 116 by accessing data in database 112 via database server 104.

Database 112 includes source data for different subscribers that are using analytics application 116. The source data in database 112 may be formatted for the cube data structure. In one example, base measures are built into fact tables and categorized according to dimensions, which may be slices corresponding to time, department, company, division, and location. The data and data object hierarchies can be processed based on collating the dimensions into the cube data array. The cube data structure can aggregate reportable values into aggregates that can be validated and reported to a user. In one example, a cube data structure may enable easy aggregation of multiple values into a single number for analytics reporting via analytics application 116. And each number can be categorized by dimensions to determine the attributes that make up the number.

The cube data structure is an optic that is queried by analytics application 116 of a client 114. The cube data structure is an interface between OLAP tables in database 112 (e.g., fact, branches, and key mapping tables) and analytics application 116. The cube data structure presents the data in a more readable fashion as measures and dimensions, rather than a collection of tables. The cube data structure also allows queries to be run by analytics application 116.

OLAP server 102 also includes change detection logic 108, which can detect changes in source data that is received from data source 109 for different subscribers. The changes in the source data cause updates that need to be processed for subscribers. This results in updates that need to be processed. In one embodiment, the updates are incrementally processed by an update process 120. Update process 120 may execute at set intervals, such as daily, hourly, etc. In one embodiment, update process 120 may execute for every subscriber that subscribed for this type of incremental update processing. The update process involves checking if data has changed in database 112, and if so, re-processing the changed data to the format required for the cube data structure. The incremental update process may only update records for a subscriber that are required for the update and not all of the subscriber's records. Although an incremental type update process is described, other update processes to subscriber's records may be used, such as continuous or real-time updates.

An update scenario processor 106 selects a scenario that applies to the updates. For example, update scenario processor 106 selects among different scenarios that may apply to an update. The different scenarios may allow update scenario processor 106 to process the fewest number of records possible for an update. In one embodiment, update scenario processor 106 may select from three different scenarios; however, although three scenarios are discussed, other numbers of scenarios may be used.

Figure 1B:
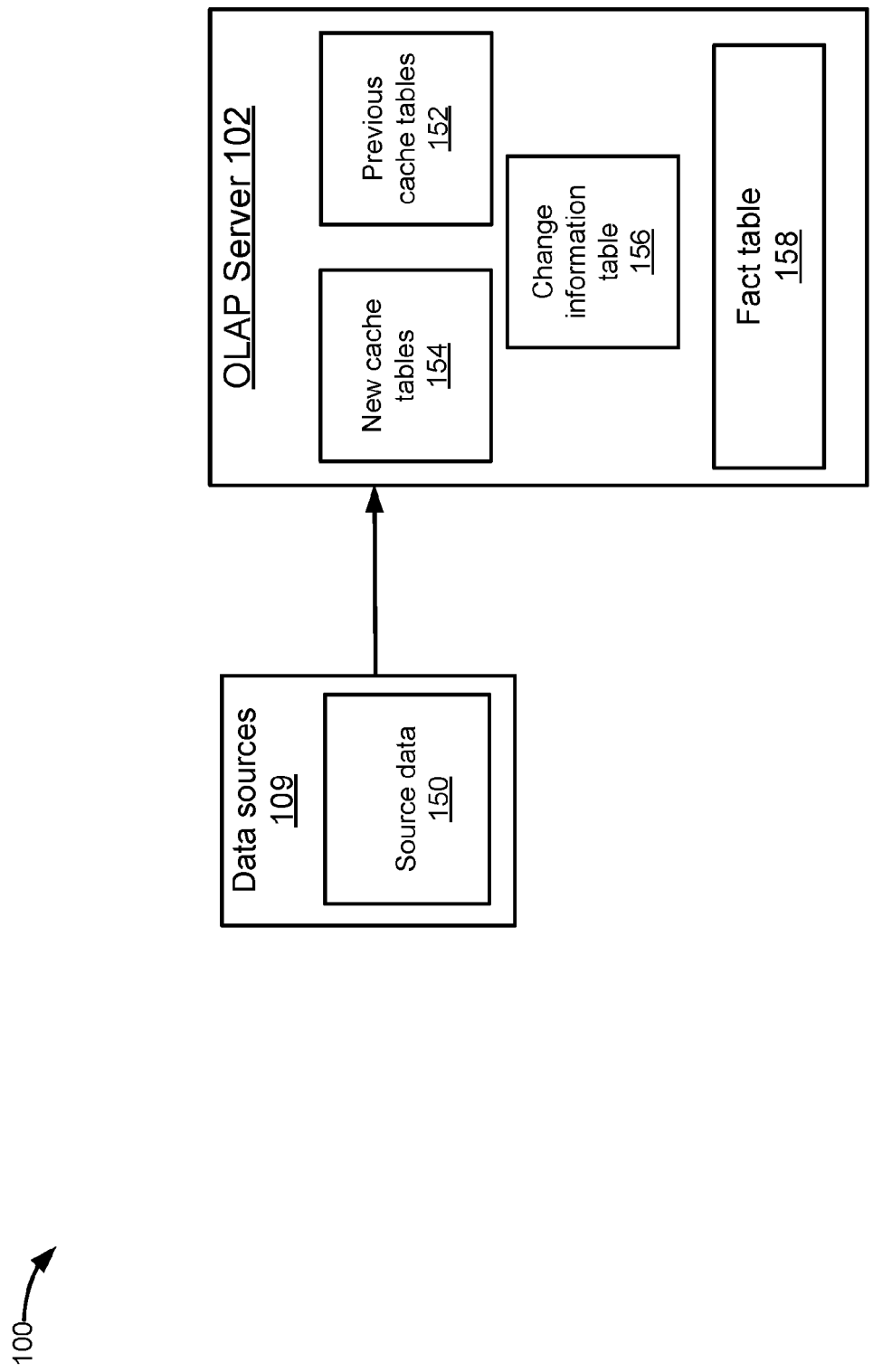
FIG. 1B shows an example of detecting changes in source data according to one embodiment.

To apply a scenario, particular embodiments detect changes first. FIG. 1B shows an example of detecting changes in source data according to one embodiment. OLAP server 102 loads source data 150 from data sources 109 into database 112. For example, OLAP server 102 uses remote sources of virtual table mechanisms that are configured to copy data from data sources 109 into new cache tables 154 in database 112. In database 112, there is already a cache table 152 that was created at the time of the last update process (e.g., either the initial load or an incremental update). Change detection logic 108 generates a query for each particular data source table in the source data. This query will determine updated, added, and deleted records along with any effective from date information available for each applicable entity. For example, the query may compare the information in the new cache table at 154 to the data in the old cache table 152.

Based on the above query, a change information table (CHANGE_INFO_TABLE) 156 includes the changed information from a comparison of previous cache table 152 to new cache table 154. Change detection logic 108 uses this information to determine new, updated, and deleted rows for each entity. The changed information may summarize records that have changed in source data from data sources 109.

Referring back to FIG. 1A, in one embodiment, the changes are incrementally processed by update process 120, where the update process may execute at set intervals, such as daily, hourly, etc. For example, update process 120 may execute for every subscriber that subscribed for this type of incremental update processing. In one embodiment, the update process involves checking if data has changed in database 112, and if so, re-processing the changed data to the format required for the cube data structure. The incremental update process may only update records for a subscriber that are required for the update and not all of the subscriber's records. Although an incremental type update process is described, other updates to subscriber's records may be used.

Update scenario processor 106 uses the changed information in change information table 156 to determine entities that require an update. Then, update scenario processor 106 selects among three scenarios to use for the update. As will be discussed in more detail below, the first scenario is for new records added for an entity after the last existing effective from date for an entity in a table, such as in a fact table 158. The second scenario results when new records or updates to existing records occur for the entity on the last existing effective from date for an entity in the fact table. The third scenario results when new records or updates occur for records for the entity prior to the last existing effective from date for an entity in the fact table, or there is a deletion of a record. Updates to table 158 may be referred to as a fact table, which summarizes facts for entities of a subscriber.

Update Process Overview

Figure 2:
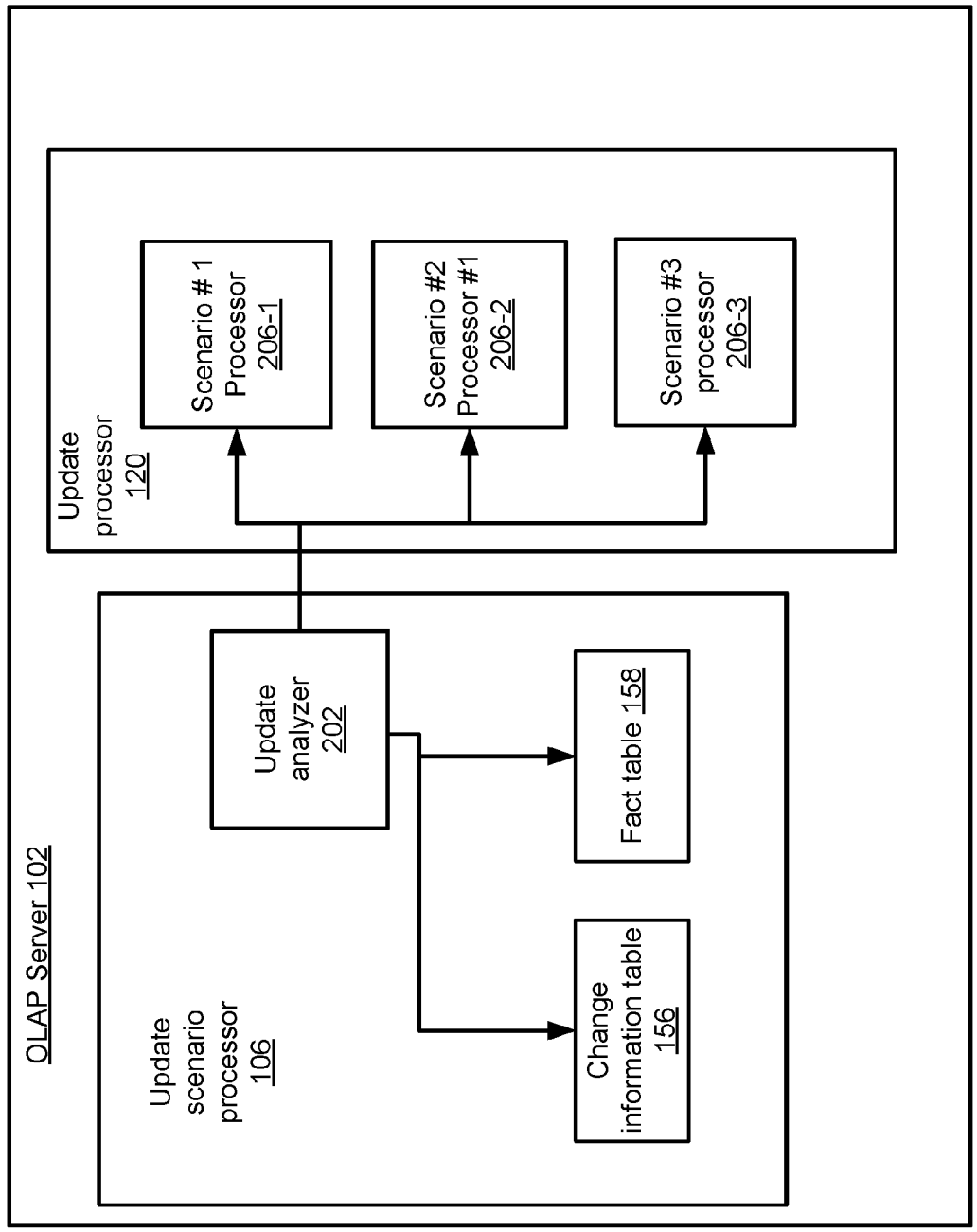
FIG. 2 depicts a more detailed example of an update scenario processor and an update processor according to one embodiment.

FIG. 2 depicts a more detailed example of update scenario processor 106 and update processor 120 according to one embodiment. An update analyzer 202 receives the updates that need to be performed. For example, for each entity that needs to be updated, update analyzer 202 can then determine to which of the scenarios the updates correspond to. In one example, if there is only a single update to one record, update analyzer 202 may classify the single update into one of three scenarios, scenario #1, scenario #2, or scenario #3. To determine the scenario, update analyzer 202 may query fact table 158 to determine a last effective from date for the records of fact table 158. The effective from date is the date in which this record became effective, such as a date an entity started working in a location. Then, update analyzer 202 compares the last effective from date to the effective from date for the updated record from change information table 156. Based on this comparison, update analyzer 202 selects a scenario as will be discussed below.

If the updates include multiple records, that is, the entity had multiple records either added or updated, update analyzer 202 may determine which scenario should apply based on analyzing all of the scenarios that apply to all the updates. That is, when performing an incremental update, only one scenario is applied per entity to all the records that are to be updated by the incremental update at that time interval even if the updates are classified into different scenarios. For example, a first update is classified in the first scenario, a second update is classified in the first scenario, a third update is classified in a second scenario, and so on. Then, update analyzer 202 selects one of the scenarios based on the classifications.

In the case where all the updates get classified into a single scenario, then that scenario is selected. However, when there are multiple records classified in different scenarios, update analyzer 202 may select one of the scenarios using a scenario selection process. In one embodiment, if there are multiple records classified in both scenario #1 and scenario #2, then update analyzer 202 selects scenario #2. Also, if there is any update classified in scenario #3 (e.g., scenarios #1 and/or #2 and also scenario #3), then update analyzer 202 selects scenario #3. The reasoning behind selecting one of these scenarios is because of the type of processing that needs to be performed for each scenario. For example, update process 120 would not be able to update those records that fall under scenario #2 if the update process for scenario #1 is used. However, using scenario #2, the records that fall within scenario #1 can be updated properly. Further, scenario #3 processes all the records for an entity and thus covers any updates for records that fall within scenario #1 or scenario #2. In one embodiment, scenario #1 processes the least amount of records, and scenario #2 processes less records than scenario #3. Because of the transformation required to be calculated in the update, a one to one comparison cannot be made to determine which records have changed. Thus, different scenarios are used to make sure the update process processes the required records to correctly perform the update, but also processes the least amount of records required.

Update process 120 includes a scenario #1 processor 206-1, a scenario #2 processor 206-2, and a scenario #3 processor 206-3 that perform the update processing. In one embodiment, the scenario processors may use records in change information table 156 to update records in fact table 158. For example, scenario processors 206-1-206-3 perform a transform of records in change information table 156 to generate records for fact table 158.

The update process may involve performing a transformation of records in change information table 156. A transformation may be one or more rules or functions that are applied to the data of the records. For example, any record that is used as the source of a fact table also results in the records for that entity being re-processed. Also, if any of the records that are updated are used as a structure for a particular dimension (e.g., a location) in a cube, then that dimension is re-processed. Also, if the record is used to link an entity to a dimension, and that record is determined to add or remove a code to that dimension (e.g., an entity receives a location that does not exist in the location dimension already), and this also results in a re-processing of the dimension.

Scenario Processing

The processing for different scenarios will now be described. Scenario #1 processor 206-1 may process new records from change information table 156 that were added after the last effective from date for records in fact table 158. In one embodiment, scenario #1 processor 206-1 processes the new records from change information table 156 and the last record in fact table 158. In this case, records in fact table 158 other than the last existing record in fact table 158 are not processed to perform the update.

FIG. 3A shows an example of tables used in processing scenario #1 according to one embodiment. A source table 303 before the update is shown. Although source table 303 is described for discussion purposes to illustrate the use of scenarios, it will be understood that either source table 303 and/or change information table 156 could be used. Change information table 156 would include the changed or updated records of source table 303. In source table 303, a column 304-1 shows an entity ID, a column 304-2 shows an effective from date, and a column 304-3 shows a location. The entity ID is an identifier for the entity; the effective from date is the date in which this record has become effective from; and the location is the location of the entity. These records may summarize the effective from dates for locations for an entity.

An example of a fact table 158 is shown for the records that have been transformed from source table 303. In fact table 158, a column 310-1 shows an entity ID, a column 310-2 shows an effective from date, a column 310-3 shows an effective to date, a column 310-4 shows a location, and a column 310-5 shows other attributes. The entity ID; the effective from date; and the location are the same as found in change information table 156. The effective to date is the date the location is effective to and may be derived by transforming the data from source table 303. Also, other attributes may be data that is generated from tables other than source table 303. Although columns 310 are shown, it will be understood that fact table 158 may include other columns that include other information. That is, fact table 158 is created from one or more tables.

Fact table 158 includes rows 312-1-312-4 that are generated based on a transformation of respective records 306-1-306-4 in source table 303. Each record in source table 303 may be processed and transformed into a record in fact table 158.

Figures 3B, 3C:
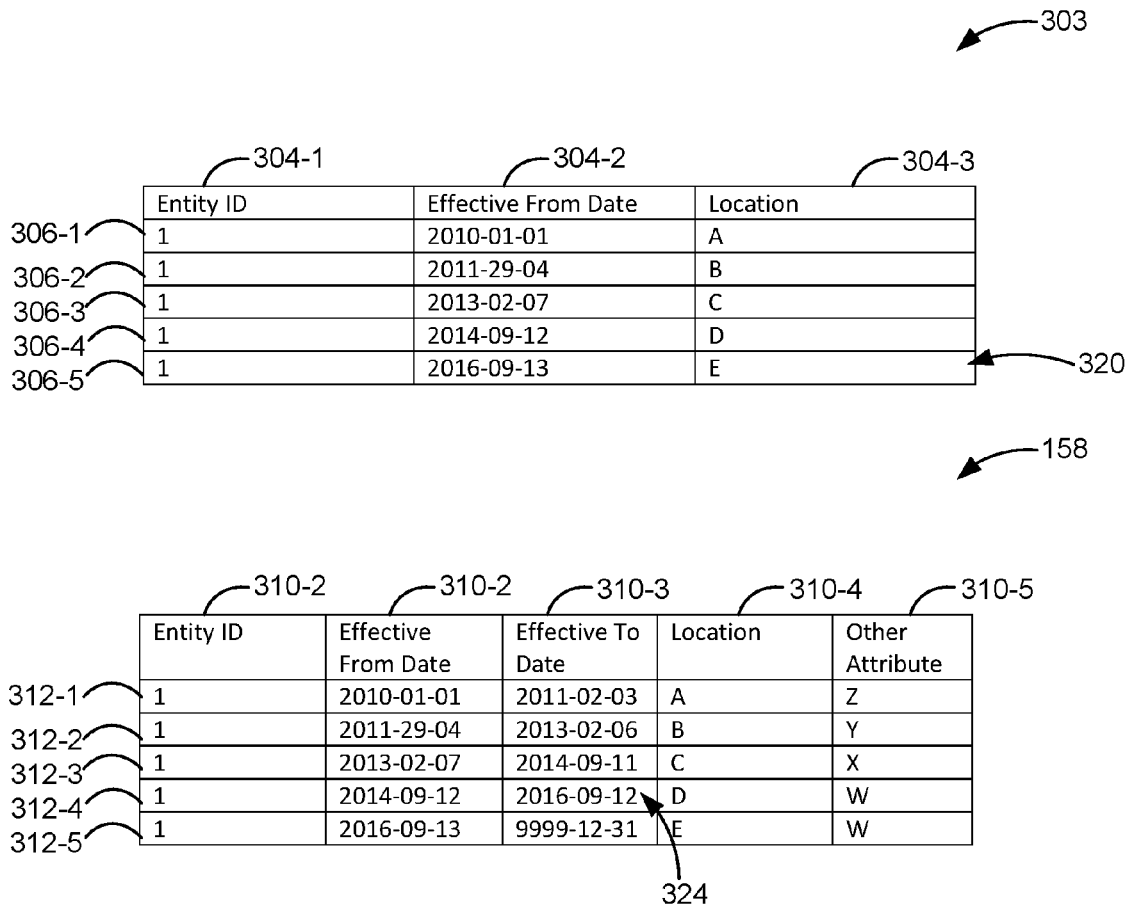
FIG. 3B shows an example of a source table and a fact table after a record has been added to the source table and an update has been performed according to one embodiment.
FIG. 3C shows the two records that are processed in the fact table according to one embodiment.

FIG. 3B shows an example of source table 303 and fact table 158 after a record has been added to source table 303 and an update has been performed according to one embodiment. As shown at 320, a row 306-5 has been added to source table 303. This record indicates the entity is associated with a new location "E" from an effective from date of "2016-09-13". In this case, the record in row 306-5 includes an effective from date after a last effective from date for the entity from fact table 158. The last effective from data for the entity may be associated with a record in fact table 158. That is, the effective from date of "2016-09-13" is after the effective from date of "2014-09-12" in row 312-4 of fact table 158.

To perform the update, scenario #1 processor 206-1 does not process all the records, which would be 5, in source table 303 and then re-insert the records back into fact table 158. Rather, scenario #1 processor 206-1 processes the last existing record in row 312-4 in fact table 158 in addition to any new records in source table 303 (e.g., the new record in row 306-5 of source table 303) to perform the update. For discussion purposes, the new record in source table 303 will be described, but it will be understood that change information table 156, which summarizes changes in source table 303, could also be used. If there are any other new records in source table 303, scenario #1 processor 206-1 also processes those new records. This means instead of processing 5 records, scenario #1 processor 206-1 only processes 2 records, row 306-5 of source table 303 and row 312-4 of fact table 158. This scales also such that if an entity had 50 existing records across all source tables 303, scenario #1 processor 206-1 may only have to process 2 records.

To illustrate the processing that could be performed, an example of fact table 158 after the update is shown. In this case, a record in row 312-4 has an effective from date of "2014-09-12" to an effective to date of "9999-12-31" before the update. After the update, at 324, the effective to date for the record in row 312-4 has been changed to "2016-09-12". Scenario #1 update processor 306-1 performs this update by transforming data from row 306-5 of source table 303. The effective to date may be generated based on the effective from date of "2016-09-13" in the new record in row 306-5 in source table 303. Scenario #1 update processor 306-1 also adds a new row 312-5 to fact table 158 to reflect the new record in source table 303. This new record shows the new location and an effective from date for the entity of "9999-12-31". In this update, the three records in rows 312-1, 312-2, and 312-3 of fact table 158 do not need to be re-processed. That is, any other records before the last record in fact table 158 before the update do not need to be processed. FIG. 3C shows the two records that are processed in fact table 158 according to one embodiment. In this case, the record from row 306-5 is used to generate row 312-5 of fact table 158. Further, row 312-4 in fact table 158 is re-processed.

When the second scenario applies, scenario #2 processor 206-2 performs the update when the earliest new record for the entity in source table 303 has either been added with the same latest effective from date in fact table 158 or a record in source table 303 that has the last effective from date in fact table 158 has been modified. It is possible for multiple records on the same day to exist for an entity because this is both possible in a single table and also because there are multiple tables that are processed for a single entity. All of the records in the multiple tables with the same effective from date need to be reprocessed. FIG. 4A shows an example of source table 303 after the update has occurred according to one embodiment. At 402, the location for the record in row 306-4 in source table 303 has been changed from "D" to "E". At 404, the effective from date of "2014-09-12" remains the same, however. In this case, scenario #2 processor 206-2 reprocesses the record in row 312-4 of fact table 158. Scenario #2 processor 206-2 may use row 306-4 of source table 303 to generate row 312-4 of fact table 158. Also, scenario #2 processor 206-2 needs to reprocess the second last record in row 312-3 from the effective from date "2013-02-07". The two records in rows 312-1 and 312-2 do not need to be re-processed. That is, any further records before the second to last record from the updated record in fact table 158 do not need to be processed.

Scenario #2 processor 206-2 needs to process the second to last record because some information in row 312-4 may be based on data in row 312-3, such as the "Other Attribute" field, which is assumed to come from a table that was not updated. As row 312-4 is being re-calculated, scenario #2 processor 206-2 may need to use row 312-3 as the basis to generate the information for row 312-4. For example, a change in location between row 306-3 (and therefore row 312-3) and row 306-4 (and therefore row 312-4) could be considered a "movement" by the entity, and scenario #2 processor 206-2 needs to calculate that on the record in row 312-4. FIG. 4B shows an example of fact table 158 after the update according to one embodiment. In row 312-4, at 406, the location has been changed from "D" to "E".

FIG. 4C shows the records that were processed to perform the update according to one embodiment. Three records are processed, rows 312-3 and 312-4 from fact table 158 and row 306-5 from source table 303. Note that in this example, the "Other Attribute" field is being sourced from another table (and therefore another record), and the value of W has the same effective from date as the record with the Location of E in row 312-4. This shows that any other records with the same effective from date will also need to be re-processed, regardless of whether they were updated, resulting in lower efficiency than Scenario #1. Also, row 306-5 from source table 303 is processed to generate the updated row 312-4. In Scenario #1, the value of W had an effective from date that was different from the effective from date for the record associated with location E and thus any other records that did not have the same effective from date from other tables did not need to be processed. Thus, scenario #2 may process more records than scenario #1.

In scenario #3, scenario #3 processor 206-3 may process all the records of source table 303 to insert records in fact table 158. This may occur when there are updates for records for the entity for time periods that are before the last effective from date, or records are deleted. All the records may be processed because it may be complex for scenario #3 processor 206-3 to determine which time periods have been updated for the entity and which time periods have not. Thus, it may be faster for scenario #3 processor 206-3 to process all the records in source table 303 at once for the entity.

There may be other exceptions that may default the processing to scenario #3, such as exceptions that result in a transformation from an update that causes a default to scenario #3. For example, when a calculated column is created that spans more than two records at runtime, then scenario #3 will be used. This is because for this kind of transformation, it is difficult to determine which fields can be used or not used in records of source table 303 and/or fact table 158, and scenario #3 may be run in these cases.

Method Flows

Figure 5:
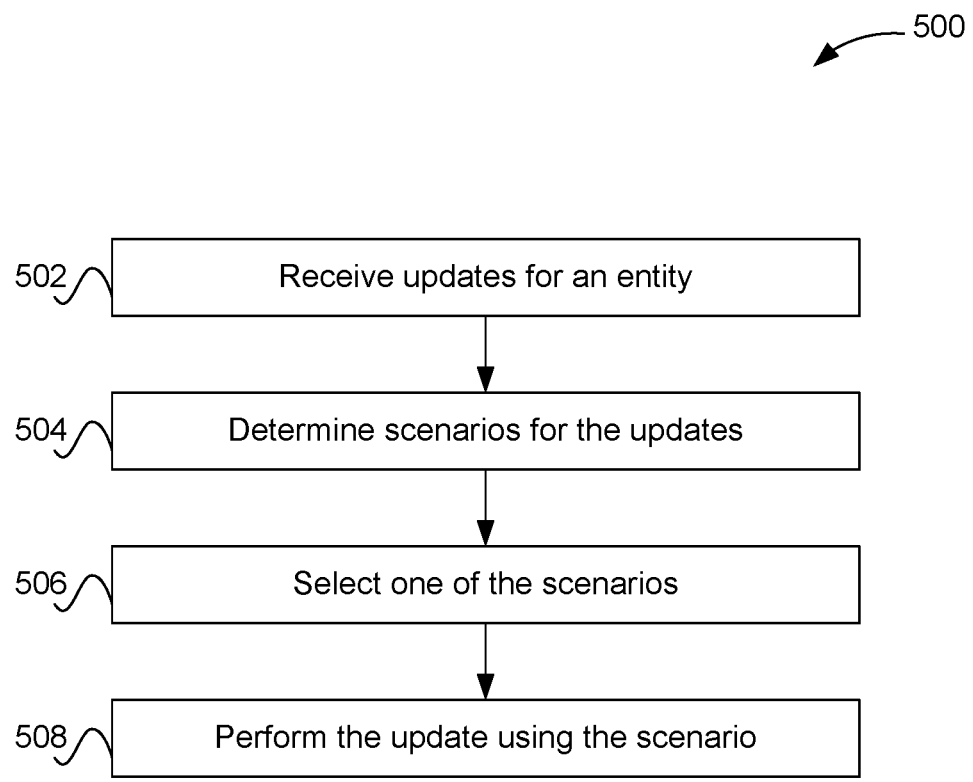
FIG. 5 depicts a simplified flowchart of a method for determining scenarios according to one embodiment.

FIG. 5 depicts a simplified flowchart 500 of a method for determining scenarios according to one embodiment. At 502, update analyzer 202 receives updates for an entity. The updates may be updated records in source table 303.

At 504, update analyzer 202 determines scenarios for the updates. For example, if there are 20 updates, update analyzer 202 may classify each of the 20 updates into one of the scenarios.

At 506, update analyzer 202 may select one of the scenarios. For example, the process described above may be used to select one of the scenarios. At 508, a scenario processor 206 performs the update. For example, one of three scenario updates may be performed. The updates may then need to be transformed and input into a fact table 158.

Figure 6:
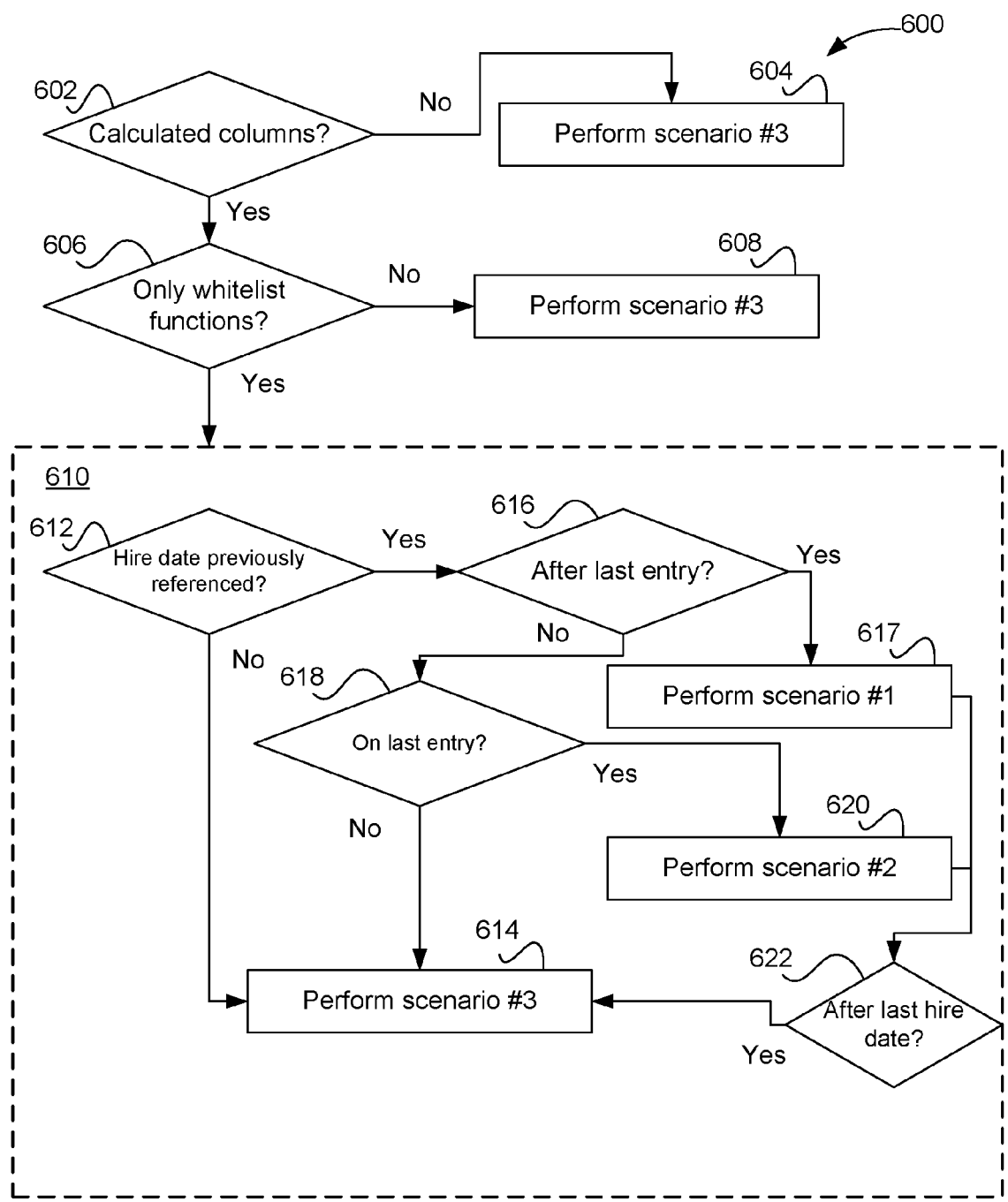
FIG. 6 depicts a more detailed flowchart of a method for performing the scenario selection according to one embodiment.

FIG. 6 depicts a more detailed flowchart 600 of a method for performing the scenario selection according to one embodiment. At 602, update scenario processor 106 determines if there are any calculated columns in the update. As discussed above, this may be an exception. If there are calculated columns, then at 604, scenario #3 is performed. Other exceptions may be appreciated that also cause scenario #3 to be used.

If there are not any calculated columns, then at 606, update process 120 determines if only whitelist functions are referenced. Whitelist functions may be transformations that are eligible for update processing by scenario #1 and/or scenario #2. The whitelist functions may be set by the subscriber or service provider. If there are functions other than whitelist functions referenced, then at 608, scenario #3 is performed. The other functions may be set by a subscriber or service provider as defaulting to scenario #3 processing.

If only whitelist functions are referenced, then the process proceeds at 610 to determine which scenario to perform per entity. The process at 610 may be performed for each entity. At 612, update scenario processor 104 determines if the hire date was previously referenced for the updated period. If the hire date was not, then at 614, scenario #3 is used. The reason scenario #3 is used is because the hire date may be before the last effective from date.

At 616, update scenario processor 106 determines if the earliest updated record from date (FROM_DATE) is after the last entry in the fact table for the effective from date (FACT FROM_DATE). If this is true, then at 617 update scenario processor 106 performs scenario #1. If not, at 618, update scenario processor 106 determines if the earliest updated record effective from date is on the last effective from date. If so, then at 620 update scenario processor 106 performs scenario #2.

After scenario #1 and/or scenario #2 are run, at 622, update scenario processor 106 determines if the hire date usage has changed. If so, at 614, update scenario processor 106 re-runs the affected entities with scenario #3. This is because the hire date has changed and all the records need to be re-processed for an entity.

Although fact tables have been described, dimensions may be updated and may also need re-processing. To determine if a dimension requires re-processing, two pieces of data are checked by update process 120. The first check is on columns in fact table 158 that make up a branch value that joins to the dimension. If changes are made to these values via insert, update, or delete, then a re-run of the branches query is required. To handle structure or labels that are defined via query, the underlying columns are tested to see if data has changed via insert, update, or delete. If a change has occurred, then a re-run of branches is required. This is because there may not be effective from dates in the branches and a subset of records to update may not be accurately determined. Thus, the reprocessing of all records is performed.

Figure 7:
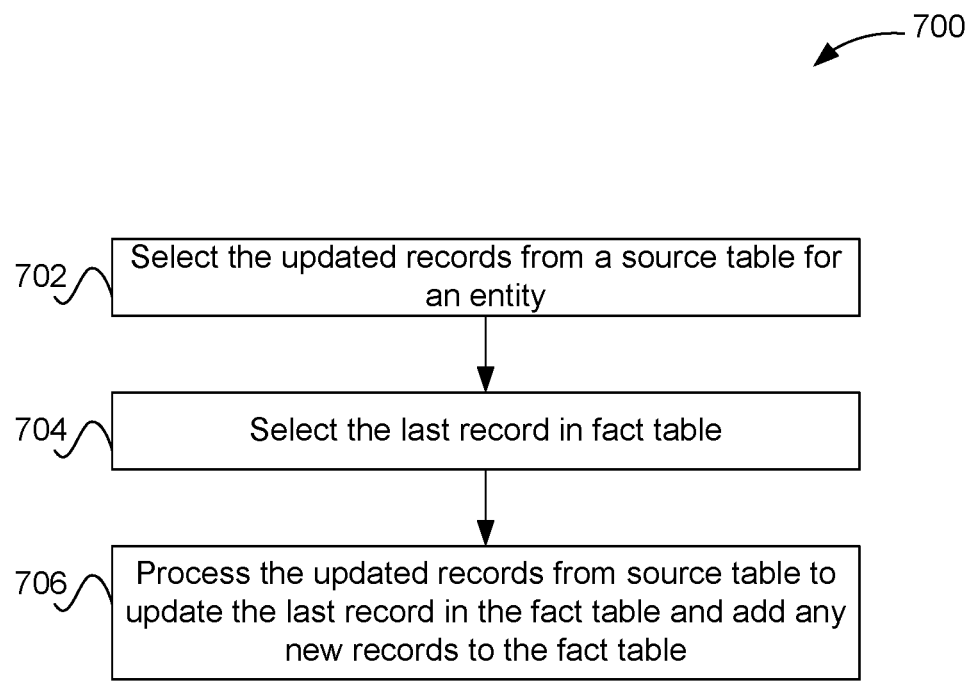
FIG. 7 depicts a simplified flowchart of a method for performing an update for scenario #1 according to one embodiment.

FIG. 7 depicts a simplified flowchart 700 of a method for performing an update for scenario #1 according to one embodiment. This process may be performed for each entity for a subscriber that has updated records. At 702, update process 120 selects the updated records from source table 303 for an entity. At 704, update process 120 selects the last record in fact table 158.

At 706, update process 120 processes the updated records from source table 303 to update fact table 158. This updates the last record in fact table 158 and adds any new records to fact table 158.

Figure 8:
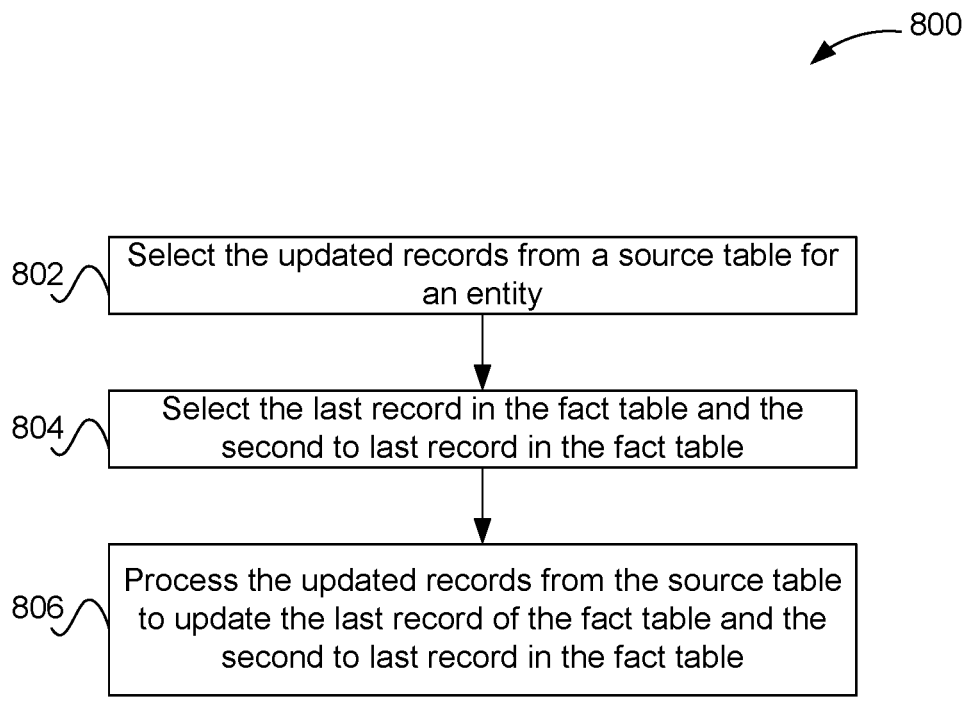
FIG. 8 depicts a simplified flowchart of a method for performing an update for scenario #2 according to one embodiment.

FIG. 8 depicts a simplified flowchart 800 of a method for performing an update for scenario #2 according to one embodiment. This process may be performed for each entity for a subscriber that has updated records. At 802, update process 120 selects the updated records from source table 303 for an entity. At 804, update process 120 selects the last record in fact table 158 and the second to last record in fact table 158.

At 806, update process 120 processes the updated records from source table 303 to update fact table 158. This updates the second to last record in fact table 158 and last record in fact table 158.

Accordingly, update processing is performed by minimizing the number of records that are processed in the incremental update. The incremental update looks at certain fields in tables that have been changed to determine a scenario. Then, a scenario is selected to process the updates. By using different scenarios, the majority of the updates can be processed using scenario #1 or scenario #2. Only a small number of updates may fit into scenario #3 and require a high number of records to be processed.

System Implementation

Figure 9:
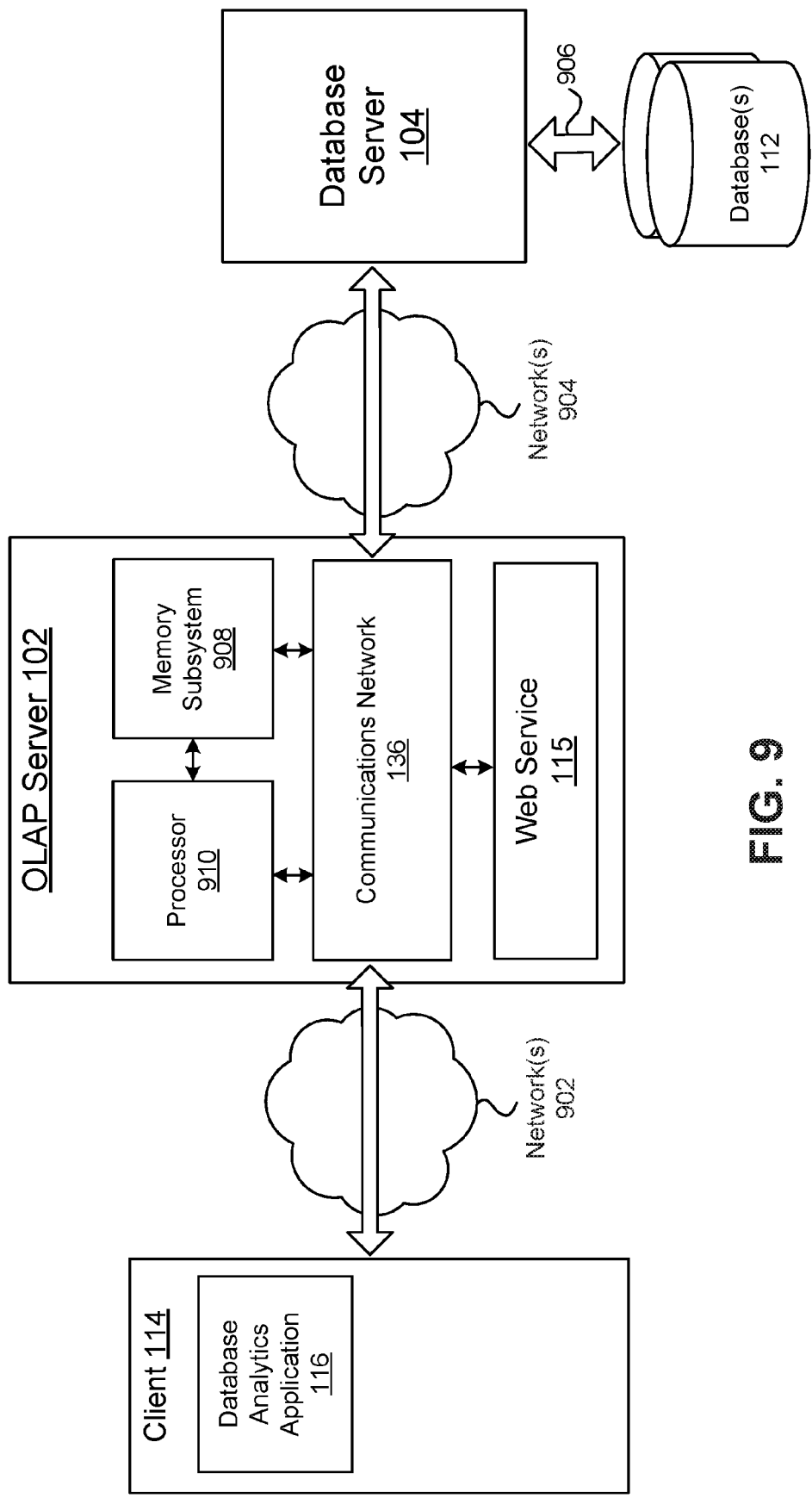
FIG. 9 depicts a conceptual overview block diagram of an example embodiment of a system for selecting scenarios in accordance with the techniques described in this disclosure.

FIG. 9 depicts a conceptual overview block diagram of an example embodiment of a system for selecting scenarios in accordance with the techniques described in this disclosure. The described database analytics application may be web-based or may reside locally on a user's computer system. The database analytics application may be used to interact with and to configure and view reports of subscriber data. In one embodiment, the system may be configured to provide a user interface for the analytics application via a web service in, for example, in a cloud-based computer network architecture.

As shown in FIG. 9, one or more clients 114, each having at least one user interface, are in communication with OLAP server 102, which may be a web server, via one or more networks 902. OLAP server 102 may provide a web service, such as an OLAP service, to the user interfaces of the clients 114 via, for example, a web service application 115 stored on OLAP server 102. OLAP server 102 includes processor 910 and memory subsystem 908 to perform the scenario selection process described herein.

In FIG. 9, OLAP server 102 is further in communication with a backend database server 104 over one or more networks 904. The database server 104 is further in communication with one or more databases 112 adapted to store data. In one embodiment, the database server 104 may be in remote communication with the databases 112 via one or more communication links or networks 906. Alternatively, database 112 may be a component of the database server 104 and configured to communicate with the database server 104 via a direct or indirect connection or network. In addition, the database(s) 112 may be implemented as any type of database system. One example embodiment includes a relational database system in which data is stored in structured database tables (or other data structures) comprised of rows and columns, and accessed through data storage rules (or schemas). Other examples of database systems include database systems where data can be stored in a semi-structured or unstructured format.

In one embodiment, the database server 104 can be configured to perform data accesses operations on data stored in the databases 112 via one or more communications links 906. The database server 104 may be implemented as an individual computer hardware server or as an array of computer hardware servers logically coupled together and working in a functionally coordinated manner. Generally, a database server 104 comprises a system configured to perform data access operations with respect to data stored in one or more repositories of data (e.g., database(s)). Depending on the type of database server 104, data operations may range from simple operations, such as storing and retrieving data, to more complex operations such as calculating statistics based on the data, or arranging, modifying, or formatting data.

The database server 104 may be configured to communicate with a memory subsystem to store and retrieve data for performing operations in accordance with the techniques described in this disclosure. The database server 104 may further include a database manager (not shown). The database manager may be configured as a general-purpose database management system ("DBMS") that communicates with the one or more databases for the purposes of storing and retrieving data to or from the databases. A DBMS may be configured as a computer software application that interacts with the database and other applications or users to capture and analyze data.

For example, a DBMS may be designed to allow for definition, creation, querying, update, and administration of databases. The database manager may comprise an integrated set of computer hardware and software programs that allow client systems to interact with the databases to provide access to data. In addition, the database manager may provide various functions that allow entry, storage, and retrieval of large quantities of information, and provide a mechanism to manage how the information is organized in the databases.

A database "query" may comprise a request for data or information from a database table or combination of database tables (or other data structures) in the database. Queries are the mechanism for retrieving information from a database and generally consist of questions presented to the database in a predefined format. This data may be generated as results returned by the SQL, or as pictorials, graphs or complex results, e.g., trend analysis from data-mining applications. Many database management systems use the SQL standard query format.

At least certain embodiments are configured to be implemented using in-memory analytics. In-memory analytics is an approach to querying data when it resides in a computer's random access memory (RAM) as opposed to querying data that is stored on separate physical disks. This can result in vastly shortened query times, allowing business intelligence and analytics applications to support faster business decisions. In addition to providing fast query response times, in-memory analytics can reduce or eliminate the need for data indexing and storing pre-aggregated data. This can reduce IT costs and allow faster implementation of business intelligence and analytics applications. In one embodiment, the system described in this disclosure can be implemented on an in-memory, column-oriented, relational database management system. The platform allows data analysts to query large volumes of data in real time, and its in-memory database infrastructure can free analysts from having to continuously load or write-back data to physical disks.

As will be appreciated by persons of skill in the art, network(s) may be implemented as a single wired or wireless network, or multiple separate networks in communication with one another. Network(s) may be implemented as any wired or wireless network(s). For example, the networks described herein can be implemented as a local area network ("LAN"), wide-area network ("WAN"), combination of LANs and WANs, the Internet, or any other type of communication network adapted for communicating electronic messages and information. Further, network(s) may be implemented as a physical array of hardware resources or as a virtual array, or any combination thereof. Network(s) may also be implemented in a cloud-based network configuration. For example, network(s) may be implemented as public or private cloud network, or combination thereof. No specific network or network architecture should be construed as limiting the embodiments and techniques described herein.

Figure 10:
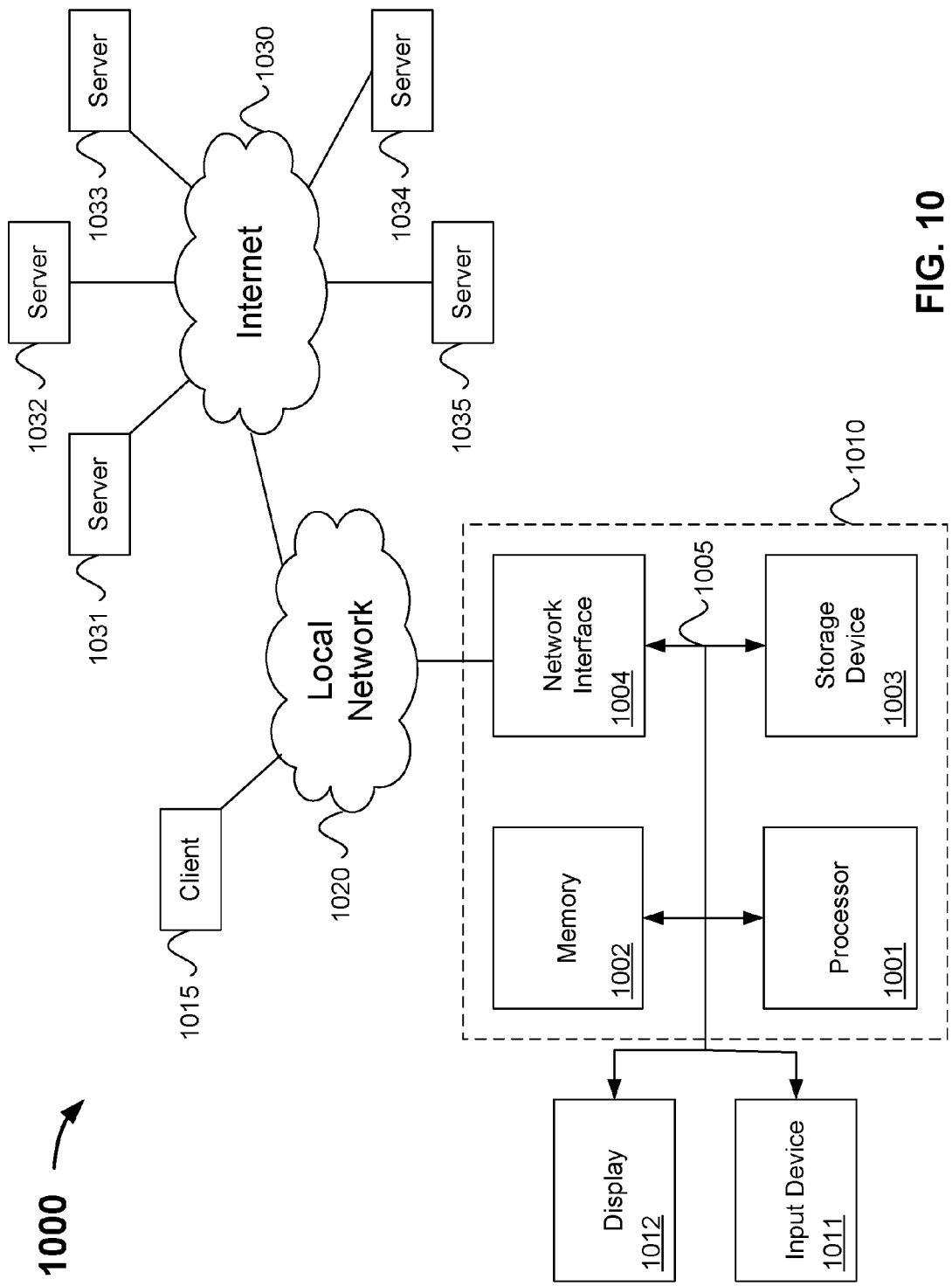
FIG. 10 illustrates hardware of a special purpose computing machine according to one embodiment.

FIG. 10 illustrates hardware of a special purpose computing machine according to one embodiment. The logic may be included on entities in system 100 including OLAP server 102, database server 104, and client 114. An example computer system 1010 is illustrated in FIG. 10. Computer system 1010 includes a bus 1005 or other communication mechanism for communicating information, and a processor 1001 coupled with bus 1005 for processing information. Computer system 1010 also includes a memory 1002 coupled to bus 1005 for storing information and instructions to be executed by processor 1001, including information and instructions for performing the techniques described above, for example. This memory may also be used for storing variables or other intermediate information during execution of instructions to be executed by processor 1001. Possible implementations of this memory may be, but are not limited to, random access memory (RAM), read only memory (ROM), or both. A storage device 1003 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1003 may include source code, binary code, or software files for performing the techniques above, for example. Storage device and memory are both examples of computer readable storage mediums.

Computer system 1010 may be coupled via bus 1005 to a display 1012, such as a cathode ray tube (CRT) or liquid crystal display (LCD), for displaying information to a computer user. An input device 1011 such as a keyboard and/or mouse is coupled to bus 1005 for communicating information and command selections from the user to processor 1001. The combination of these components allows the user to communicate with the system. In some systems, bus 1005 may be divided into multiple specialized buses.

Computer system 1010 also includes a network interface 1004 coupled with bus 1005. Network interface 1004 may provide two-way data communication between computer system 1010 and the local network 1020. The network interface 1004 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1004 sends and receives electrical, electromagnetic, or optical signals that carry digital data streams representing various types of information.

Computer system 1010 can send and receive information through the network interface 1004 across a local network 1020, an Intranet, or the Internet 1030. In the Internet example, software components or services may reside on multiple different computer systems 1010 or servers 1031-1035 across the network. The processes described above may be implemented on one or more servers, for example. A server 1031 may transmit actions or messages from one component, through Internet 1030, local network 1020, and network interface 1004 to a component on computer system 1010. The software components and processes described above may be implemented on any computer system and send and/or receive information across a network, for example.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
    determining, by a computing device, one or more records that are added, updated, or deleted for an entity;
    analyzing, by the computing device, one or more effective from dates for the one or more records and a last effective from date for the entity in a database table for the entity to classify the one or more records in one or more scenarios in a plurality of scenarios;
    selecting, by the computing device, a scenario in the plurality of scenarios based on the one or more effective from dates for the one or more scenarios and the last effective from date for the entity; and
    performing, by the computing device, an update process associated with the scenario to update a portion of records in the database table using the one or more records.

2. The method of claim 1, wherein a first scenario is selected when the one or more effective from dates for the one or more records are after the last effective from date for the entity in the database table.

3. The method of claim 2, wherein performing the update comprises:
    processing a first existing record with the last effective from date in the database table and the one or more records in the first database table to update the database table, wherein second existing records in the database table other than the first existing record in the database table are not processed.

4. The method of claim 3, wherein processing the first existing record comprises:
    updating a field in the first existing record based on a record in the one or more records.

5. The method of claim 4, wherein performing the update comprises:
    generating a new record in the database table from the one or more records.

6. The method of claim 1, wherein a second scenario is selected when the one or more effective from dates for the one or more records are the same as the last effective from date for the entity in the database table.

7. The method of claim 6, wherein performing the update comprises:
    processing a first existing record with the last effective from date in the database table, a second existing record in the database table with an effective from date before the last effective from date for the first existing record, and the one or more records to update the database table, wherein third existing records in the database table other than the first existing record and the second existing record in the database table are not processed.

8. The method of claim 7, wherein processing the first existing record comprises:
    updating a field in the first existing record based on a record in the one or more records.

9. The method of claim 8, wherein processing the first existing record comprises:
    updating a field in the first existing record based on the second existing record in the database table.

10. The method of claim 6, wherein a new record in the database table is not added in the update.

11. The method of claim 1, wherein a third scenario is selected when the one or more effective from dates for the one or more records are before the last effective from date for the entity in the database table.

12. The method of claim 11, wherein performing the update comprises:
    reprocessing all records for the entity to update all the records of the database table.

13. The method of claim 1, wherein:
    a first scenario applies to a first record in the one or more records and a second scenario applies to a second record in the one or more records, wherein the first record has an effective from date after the last effective from date for the entity and the second record has an effective from date on the last effective from date for the entity, and
    selecting comprises selecting the second scenario to perform the update and not the first scenario.

14. The method of claim 13, wherein performing the update comprises:
    performing the update for the first record using the second scenario.

15. The method of claim 1, wherein:
    a first scenario or a second scenario applies to a first record in the one or more records and a third scenario applies to a second record in the one or more records, wherein the first record has an effective from date on or after the last effective from date for the entity and the second record has an effective from date before the last effective from date for the entity, and selecting comprises selecting the third scenario to perform the update and not the first scenario or the second scenario.

16. The method of claim 15, wherein performing the update comprises:
performing the update for the first record using the third scenario.

17. A non-transitory computer-readable storage medium containing instructions, that when executed, control a computer system to be configured for:
determining one or more records that are added, updated, or deleted for an entity;
analyzing one or more effective from dates for the one or more records and a last effective from date for the entity in a database table for the entity to classify the one or more records in one or more scenarios in a plurality of scenarios;
selecting a scenario in the plurality of scenarios based on the one or more effective from dates for the one or more scenarios and the last effective from date for the entity; and
performing an update process associated with the scenario to update a portion of records in the database table using the one or more records.

18. A method comprising:
determining, by a computing device, a plurality of records that are added, updated, or deleted in a first database table for an entity;
analyzing, by the computing device, a plurality of effective from dates for the plurality of records and a last effective from date for an entity in a database table for the entity to classify the plurality of records in a plurality of scenarios based on the plurality of effective from dates for the plurality of records and the last effective from date for the entity;
selecting, by the computing device, a scenario in the plurality of scenarios; and
performing, by the computing device, an update process associated with the scenario to update a portion of records in the database table using the plurality of records, wherein the scenario is used to update all of the plurality of records.

19. The method of claim 18, wherein:
a first scenario applies to a first record in the plurality of records and a second scenario applies to a second record in the plurality of records, wherein the first record has an effective from date after the last effective from date for the entity and the second record has an effective from date on the last effective from date for the entity, and
selecting comprises selecting the second scenario to perform the update and not the first scenario.

20. The method of claim 18, wherein:
a first scenario or a second scenario applies to a first record in the plurality of records and a third scenario applies to a second record in the plurality of records, wherein the first record has an effective from date on or after the last effective from date for the entity and the second record has an effective from date before the last effective from date for the entity, and
selecting comprises selecting the third scenario to perform the update and not the first scenario or the second scenario.

* * * * *